Dec. 15, 1970   R. R. HOBSON   3,548,222
THERMIONIC POWER GENERATION APPARATUS
Filed Dec. 29, 1965   2 Sheets-Sheet 2
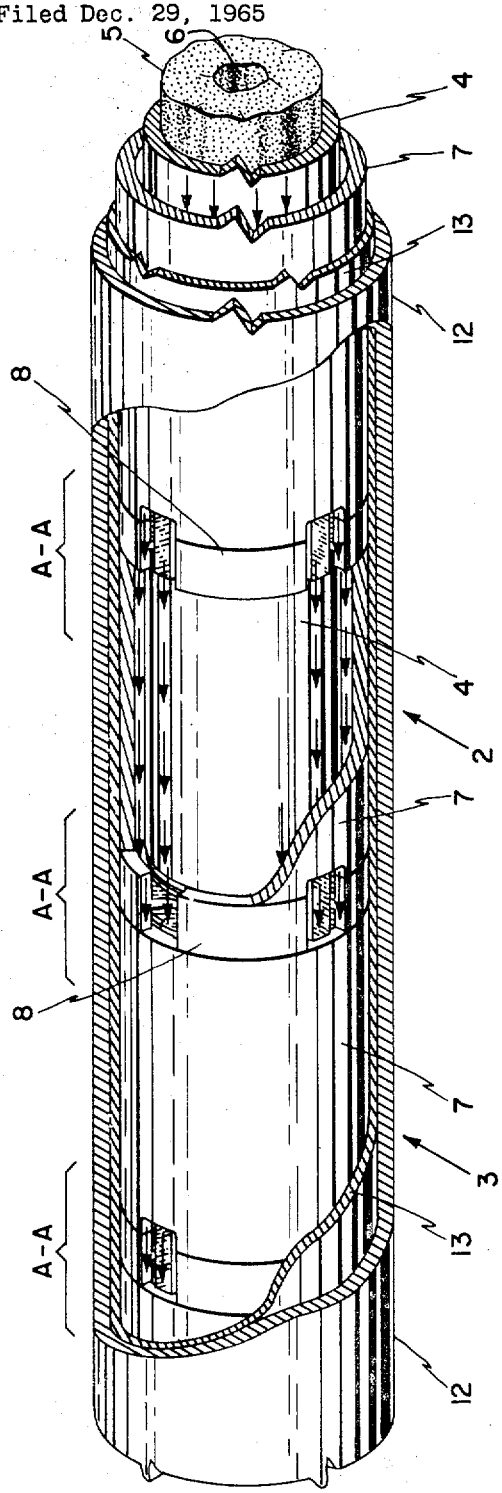
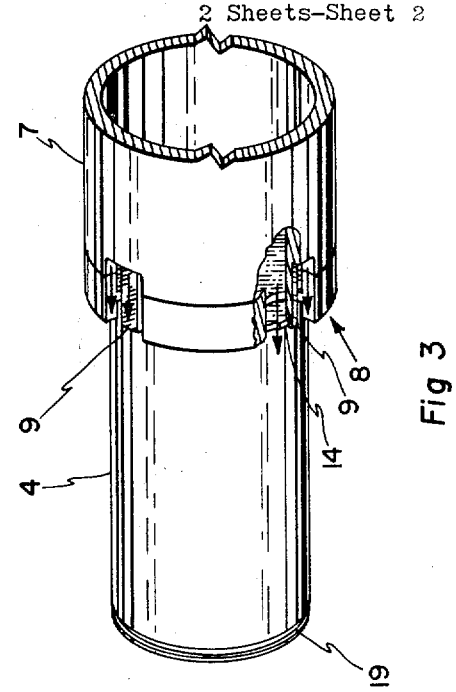
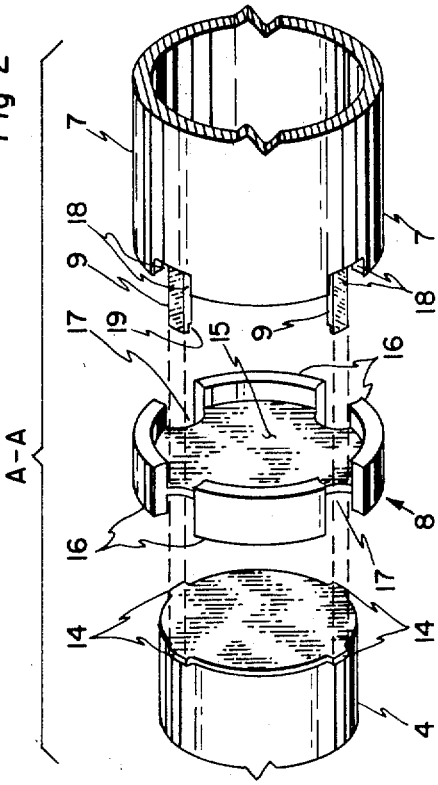
INVENTOR.
Robert R. Hobson
BY United States Patent Office 3,548,222
Patented Dec. 15, 1970

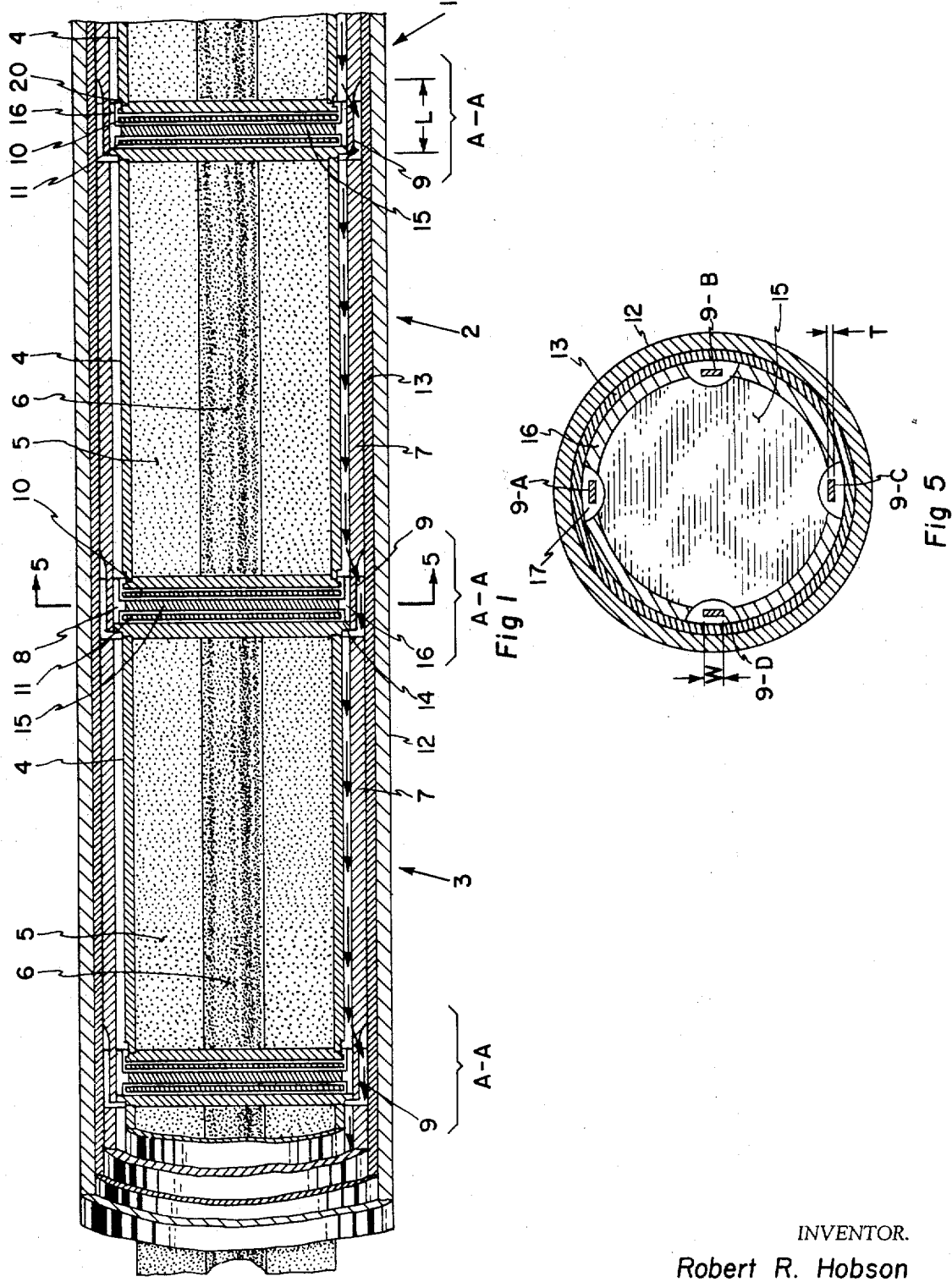

3,548,222
THERMIONIC POWER GENERATION APPARATUS
Robert R. Hobson, San Jose, Calif., assignor to General
Electric Company, a corporation of New York
Filed Dec. 29, 1965, Ser. No. 517,392
Int. Cl. H02n 3/00
U.S. Cl. 310—4                                     7 Claims

ABSTRACT OF THE DISCLOSURE

A power generation device of the thermionic converter type having an improved emitter support and series electrical connection system is disclosed. In a power generation apparatus including atleast two axially aligned thermionic converters, a plurality of straps are provided parallel to the axis of the thermionic converters to connect the collector of a first converter to the emitter of the next converter. These straps serve as both a support for the emitter and as an electrical connector. These straps are uniquely capable of maintaining the emitter in position despite wide variations in thermal expansion between emitters and collectors.

---

This invention relates to electrical power generation apparatus for use in a nuclear reactor and more particularly to said apparatus wherein heat causes the flow of an electrical current in the form of thermionic emission.

A thermionic converter is a two-electrode electrical power generation device wherein a heat differential between spaced electrodes causes the electron emission from a hotter electrode to a cooler electrode, thus establishing current flow therebetween. Thermionic converters desirably operate at high input temperatures above 1400° C. and heat rejection temperatures from 700° to 1000° C. Because of the high temperatures involved, a nuclear reaction is an appropriate source of heat for the converter.

In one particularly desirable arrangement, a nuclear reactor comprises a plurality of cylindrical, fissionable-material-containing thermionic fuel elements inserted inside a containment structure. The fuel elements themselves include fissionable material in contact with the emitter of the thermionic converter for heating the same to a high operating temperature. The heated emitter may itself form a cylindrical fuel container. To provide sufficient power output each fuel element may include a plurality of serially connected thermionic converters extending the length of the fuel element.

Among the most promising types of thermionic converters are those including alkali metal vapor between the collector and the heated, electron-emitting, emitter member. This alkali metal vapor, and especially cesium vapor, has the desirable property of forming an ionized plasma for neutralizing undesirable space charge between the converter electrodes and also has the property of lowering the work function of the electrode surfaces, or that energy value to which electrons must be excited for emission at the emitter electrode and through which electrons drop when arriving at the collector electrode. Thermionic converters, particularly of this type, have been found to generate the most power most efficiently at emitter temperatures, for example, above 1700° C.

Such operating temperatures pose a problem in constructing economical and reliable devices for mechanically and electrically interconnecting the plurality of serially arranged thermionic converters extending longitudinally in each fuel element. Not only is it desirable to have minimum spacing between adjacent converters but it is necessary to maintain close tolerances at maximum operating temperatures. These objectives must be met and still accommodate considerable longitudinal and radial expansion of converter components during extreme temperature variations which occur during startup and shutdown operations. In addition, it is necessary that the thermionic converters, and in particular the intercell connection structure, be made economical simple and reliable.

Briefly, the present invention achieves these objectives by the utilization of an intercell connection structure which consists of a minimum number of parts and provides maximum reliability at minimum cost. The intercell structure of the present invention includes an insulator spacer, connecting straps and emitter tabs. The insulator spacer functions to maintain adjacent converters in fixed spaced relation, provide a radial stop for the emitter of each converter (in the event there is radial displacement of the emitter), permit longitudinal thermal expansion of the emitters, provide electrical isolation of adjacent collectors, permit flow of the cesium vapor, and it has the capability of holding heat shields if desired. In the preferred embodiment, the connecting straps are formed as part of the collector structure. These straps mechanically and electrically connect the collector of one converter to the emitter of the adjacent converter by connecting the free end of the straps to the corresponding emitter tabs. The number and configuration of these straps are selected to perform several functions. These include the radial alignment of the emitters, the allowance of thermal expansion and contraction during extreme temperature conditions, the longitudinal support and positioning of the emitters, the electrical series connection between adjacent converters, and minimum spacing between adjacent emitters. The width, thickness and length of the connecting straps are selected to bring about optimum electrical and thermal properties and still achieve the above functions.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a vertical cross-section of a portion of the thermionic fuel element, in accordance with the present invention, having serially disposed thermionic converters arranged longitudinally thereof;

FIG. 2 is a pictorial view, partly in section, of the thermionic fuel element of the present invention.

FIG. 3 is a pictorial view of a subassembly, partly in section, of the thermionic fuel element of the present invention;

FIG. 4 is an exploded view of the intercell region of the thermionic fuel element of the present invention; and FIG. 5 is a sectional view of the intercell region taken at section 5—5 of FIG. 1.

Referring to the drawings, a fuel element 1, for insertion in a nuclear reactor, includes a plurality of serially of serially connected thermionic converters 2 and 3 extending longitudinally in the fuel element. Each converter includes an emitter member 4, conveniently cylindrical in shape, enclosing a body of fissionable fuel 5, preferably uranium dioxide. The fissionable fuel 5 is in contact with the cylindrically curved inside surface of the emitter member and substantially fills the interior of the enclosed emitter member except for a central initially evacuated portion 6 reserved for subsequently generated fission products, gases and the like.

Coaxially spaced from the emitter member is a cylindrical metal collector 7 having the function of receiving electrons emitted by emitter member 4. The interior of each thermionic converter, between emitter and collector, communicates with the next through openings provided in insulator spacer 8, the details of which will hereinafter be described, for allowing passage of alkali vapor and particularly cesium vapor through the cells of the fuel rod as indicated by the solid line arrows. At an appropriate point in the fuel element an alkali metal reservoir (not shown) communicates with one of the converters which in turn communicates to the other converters in sequence. The purpose of supplying alkali metal vapor to the interior of the converters is the reduction in space charge between the converter emitter and collector as well as a reduction of work function of the emitter and collector surfaces.

It is to be understood that a fuel element as herein described forms at least one of several removable fuel elements in a nuclear reactor for operating to provide electrical power. Such nuclear reactor may further comprise a neutron-reflective container surrounding insertable fuel elements and provided with a source of neutrons for initiating fission reaction. The source of neutrons in some instances may comprise the fuel itself and of course this is particularly the case after a fission reaction is once started in a critical mass of fissionable material. In any case, fission reaction is initiated for the purpose of heating emitter members to a temperature perferably above 1400° C. 1800° C. is an examplary emitter operating temperature. The thermal agitation of the electrons on the surface of the emitter member lifts some of the electrons from the Fermi potential of the emitter over the work function barrier, $\theta_E$, at the surface of the emitter, wherein the Fermi level is defined as that energy level which has a probability of one-half of being occupied by an electron. The electrons escaping the emitter have kinetic energy and also have increased negative potential energy relative to the electrons in the emitter. It is desirable to collect the electrons with as little loss of potenial or as little plasma loss as possible. As the electrons enter the collector electrode, they fall through the collector surface work function barrier, $\theta_C$, and finally arrive at the Fermi potential of the collector metal. The difference between the emitter and collector Fermi potentials in this configuration is the output voltage which may be applied to cause a current flow in an outside circuit (not shown) connected between the series connected emitters and collectors. The difference in Fermi potentials is also called the contact potential between emitter and collector. This voltage may have a small value but the direct current (D.C.) flow may be quite large as compared with conventional power supply apparatus. A current density of 25 amperes per square centimeter of electrode area is feasible in accordance with the present invention at high temperatures, at conversion efficiencies of 20% or better.

Connecting straps 9 electrically couple the emitter member of each converter to the collector of the immediately adjacent converter thereby providing a series circuit of converters in the element. It is to be understood that end connections in a complete fuel element are used to connect the series arrangement of converters in one element to other elements or to outside circuitry.

Although the converters are connected electrically and provided with a gaseous passage therebetween, they are otherwise desirably insulated thermally and electrically except for the aforementioned series connection. Therefore, a cylindrical insulator spacer 8 separates successive converters, this spacer desirably being formed of a dielectric material such as alumina or yttria. Heat shields 10 and 11 are preferably made of tungsen and are located at either end of the cylindrical emitter member and function to prevent transmission of excessive heat from an emitter member towards the spacer and next adjacent converters. These shields nest within insulating spacer 8 and may therefore be free to move or they may be welded, pinned or otherwise connected to the ends of the emitter members.

This fuel-containing converter structure is enclosed in a fuel element sheath tube 12 separated from the thermionic converter structure by sheath insulator 13 disposed therebetween. Sheath tube 12 is conveniently niobium while insulator 13 may be alumina or yttria. In an operating nuclear reactor, employing one or more such fuel elements, coolant is desirably circulated along the exterior surface of the fuel elements for the purpose of cooling the fuel elements including collectors 7 preferably to a temperature below 1000° C., as well as for conveying useful heat away from the reactor. The coolant can then be used in the generation of power, as for example in the operation of steam turbines and the like.

The fuel element shown in the drawings has a plurality of identical intercell connection structures A—A each of which includes insulator spacer 8, connecting straps 9 (part of collector 7), radially extending tabs 14 (part of emitter 4) and optionally, heat shields 10 and 11. Basically, the intercell connecting structure A—A functions to maintain adjacent thermionic converts 2, 3 in space relation, to provide electrical connection between the collector of one converter and the emitter of the adjacent converter, and to provide openings through which the cesium vapors may flow.

As best depicted in FIG. 4, insulator spacer 8 includes a central flat circular disc section 15 and an integral rim consisting of cylindrical sections 16 spaced at 90° intervals about the peripheral edge of disc section 15. Notches or openings 17 are formed between adjacent sections 16 and function both as passages for communicating cesium vapor and as passages for connecting straps 9. Sufficient clearance is provided between these notches and straps to permit passage of the cesium vapor. Connecting straps 9 extend beyond the end of collector 7 and also extend within the collector by forming the base ends thereof with parallel slots 18 formed in the surface of collector 7. By having connecting straps 9 partially formed in collector 7, sufficient length is provided such that optimum flexibility may be achieved without increasing the emitter to emitter spacing of adjacent thermionic converter cells. As best illustrated in FIGS. 1 and 4, when the strap is formed from the collector it may be necessary to grind or otherwise remove material therefrom to achieve proper thickness (T). In addition, notches 19 may be formed at the end of the straps to receive tabs 14. It is to be understood that straps 9 may be formed separately and then welded or otherwise connected to collector 7 or they may be integrally formed as part of the collector as shown. Mechanical and electrical interconnection of adjacent cells is achieved by welding or otherwise connecting the tips of straps 9 to radially extending tabs 14 of emitter 4 which results in the sub-assembly shown in FIG. 3. The subassemblies are then serially assembled wherein the emitter of one subassembly is inserted into the collector of the next subassembly resulting in an assembled fuel element as shown in FIGS. 1 and 2. It should be noted that there are no welded connections between adjacent subassemblies. But rather, the subassemblies are retained in the assembled positions by a slip fit between collector 7, insulator spacer 8, and sheath insulator 13 and by lightly loading the ends of the subassemblies of the fuel element together.

Connecting straps 9 have configurations that provide the optimum ratio of heat to electrical loss and to also permit thermal expansion of emitter 4 with respect to collector 7, of the adjacent thermionic converter, without overstressing any of the parts and while still holding the emitter 4 concentric with its collector 7. In FIG. 5 is shown a sectional view of insulator spacer 8 taken at section 5—5 of FIG. 1. This view depicts arrangement of connecting straps, referred to as 9A through 9D, which are used to mechanically support (and electrically connect) emitter 4 of the various cells disposed in the fuel element of the present invention. It is to be particularly noted that the width (W) of these straps is substantially greater than their thickness (T). The thickness (T) is sufficiently small and length (L) is sufficiently large to provide sufficient strap flexibility to allow bending of the straps to accommodate unequal radial expansion of the emitter and collector of adjacent thermionic converters. That is, during typical operation the volumetric average temperature of emitter 4 may be 1800° C. whereas the volumetric average temperature of collector 7 may be only 700° C. Therefore, the emitter will expand a greater distance in the radial direction than will the collector which is accommodated by the above mentioned flexibility. The width (W) and the positioning of the four straps at 90 degree intervals together provide sufficient rigidity to properly support and radially locate emitter 4 within its collector 7. For example, as viewed in FIGS. 1 and 5, the weight of emitter 4 tends to cause the free end of emitter 4 to move in a downward direction and into contact with the lower cylindrical section 16 and collector 7. However, this movement is prevented because the bending strength of straps 9B and 9D is large in this direction since the width (W) is large. In like manner, the bending strength of straps 9A and 9C is large in a direction 90 degrees from that described. Furthermore, bending in component directions is effectively resisted since all four straps contribute to prevent bending. In this manner the emitters are maintained in their proper radial positions even during large temperature changes or large radially directed forces. The cross-sectional area of these straps is maintained at a minimum to prevent heat transfer from the emitter through the straps to the adjacent collector and yet there must be sufficient area to transmit the necessary current without excessive voltage drop. It is to be understood that different numbers of straps may be used provided they achieve the herein described objectives. A typical example of strap dimensions is as follows. Width (W) equals .05 inch, thickness (T) equals .015 inch, and length (L) equals .110 inch.

Referring now to FIGS. 1 and 4, the inside diameter of cylindrical sections 16 of insulator spacer 8 is preferably selected to be smaller than the inside diameter of the collector 7. Therefore, if the free end of emitter 4 becomes radially displaced, its radial displacement is limited by sections 16 thereby preventing it from contacting collector 7 which would result in an electrical short. The free end of emitter 4 is permitted to have longitudinal expansion within cylindrical sections 16 and, for typical operation, the clearance between the end of emitter 4 and the face of disc section 15 is selected to be about 15 mils when cold and about 12 mils when hot. It has been found that alignment of the emitter by the connecting straps is excellent and therefore the face end of emitter 4 will never come into contact with cylindrical sections 16 or compress heat shields 10 during operation.

Heat shields 10 and 11 are provided to minimize the heat loss of the respective converters and to prevent excessive heating of insulator spacer 8. Heat shields 10 are captured between the face of emitter 4 and the face of circular disc section 15 of insulator spacer 8 and heat shields 11 are captured between the face of emitter 4 of the adjacent thermionic converter and the opposite face of disc section 15. It should be noted that even if heat shields 11 were allowed to move radially they could not short out the system since collector 7 and emitter 4 are at the same electrical potential. It will be appreciated, however, that heat shields 10 and 11 may be pinned or otherwise connected to the faces of their respective emitters. In certain instances, however, it has been found that these heat shields are not necessary and this may be particularly so if an opening is provided in the central region of disc section 15 since, without this opening, the differential temperature between the center of this disc section and its peripheral edges may be excessive and cause severe stresses. However, if an opening is provided in the central region of disc section 15, heat shields 10 and 11 may be retained if necessary to prevent electric arcing between adjacent emitters 4. As best depicted in FIG. 1, the free end of emitter 4 may be provided with circumferential notch 20 which functions to minimize heat loss from emitter 4 and to minimize the temperature of insulator spacer 8. It is to be understood that different forms of heat shields or chokes, familiar to those versed in the art, may be used to obtain the desired temperatures.

In view of the foregoing it can be seen that the thermionic converter fuel element intercell connection structure of the persent invention provides a fuel element that is economical, simple and reliable. In addition, this intercell connection structure makes it possible to have minimum spacing between adacent converters, maintain close tolerances and accommodate considerable longitudinal and radial expansion of converter components during operation. It should be understood that many design changes may be made in the previously described intercell connection structure such as variations in length, width, thickness, types of materials, and in the shape of the particular elements. Other possible modifications include, but are not limited to, making the insulator spacer form two thin circular discs with a metallic disc disposed therebetween to provide added strength and a thermal barrier. In addition, it may be desirable to position a metallic sleeve inside the rim of the insulator spacer to provide added strength.

The particular embodiments of this invention have been described and it should be understood that various other modifications and advantages may be made by those skilled in this particular art without departing from the spirit and scope of this invention as set forth in the following calims.

I claim:

1. An electrical power generation apparatus including first and second axially aligned thermionic converters; an insulator spacer disposed therebetween; each of said thermoionic converters having a collector and an emitter spaced from and concentrically disposed within said collector, the collector of said first thermionic converter having a plurality of spaced straps extending therefrom substantially parallel to the axis of said thermionic converters, said straps passing through a plurality of spaced openings in said insulator spacer into electrical and supporting contact with the emitter of said second thermionic converter to maintain said emitter in axial and transverse position.

2. The device of claim 1 wherein said insulator spacer includes a substantially circular disc having a rim formed by a plurality of spaced apart sections forming openings therebetween for receiving said straps.

3. The device of claim 1 wherein each of said straps extend beyond the end of said first collector and also extend within said first collector by having the base ends of each of said straps formed between substantially parallel slots formed in the end of said first collector.

4. The device of claim 2 wherein said plurality of straps comprise four straps spaced at about 90 degree intervals about the periphery of said collector wherein each of said straps has a rectangular cross-section having a width that is substantially greater than its thickness.

5. The device of claim 2 wherein the emitter of said first thermionic converter has an end nested within a first cavity formed between one side of said circular disc and said rim, and the emitter of said second thermonic converter has one end nested within a second cavity formed between the other side of said circular disc and said rim.

6. The device of claim 5 wherein a first heat shield is disposed in said first cavity and a second heat shield is disposed in said second cavity.

7. The device of claim 4 wherein each of the emitters of said first and second thermionic converters have a circumferential notch formed at the free end to prevent heat losses from said emitters to said insulator spacer.

References Cited

UNITED STATES PATENTS

| | | | |
|---|---|---|---|
| 3,054,914 | 9/1962 | Hatsopoulos et al. | 310—4 |
| 3,113,091 | 12/1963 | Rasor et al | 310—4X |
| 3,176,165 | 3/1965 | Lawrence | 310—4 |
| 3,211,930 | 10/1965 | Clement et al. | 310—4 |
| 3,259,766 | 7/1966 | Beckjord et al. | 310—4 |
| 3,286,107 | 11/1966 | Fein et al. | 310—4 |

RODNEY D. BENNETT, Primary Examiner

B. L. RIBANDO, Assistant Examiner

U.S. Cl. X.R.

176—39